(12) United States Patent
Key et al.

(10) Patent No.: US 6,446,976 B1
(45) Date of Patent: Sep. 10, 2002

(54) HYDRODYNAMIC FACE SEAL WITH GROOVED SEALING DAM FOR ZERO-LEAKAGE

(75) Inventors: William E. Key, Escondido; Lionel A. Young, Murrieta, both of CA (US)

(73) Assignee: Flowserve Management Company, Irving, TX (US)

( * ) Notice: Subject to any disclaimer, the term of this patent is extended or adjusted under 35 U.S.C. 154(b) by 28 days.

(21) Appl. No.: 09/655,810

(22) Filed: Sep. 6, 2000

(51) Int. Cl.[7] .................................................. F16J 15/34
(52) U.S. Cl. ........................ 277/367; 277/369; 277/400
(58) Field of Search ................................. 277/400, 401, 277/399, 369, 367, 408

(56) References Cited

U.S. PATENT DOCUMENTS

| | | |
|---|---|---|
| 1,667,337 A | 4/1928 | Weston |
| 2,247,505 A | 7/1941 | Kohler |
| 3,015,506 A | 1/1962 | Tracy |
| 3,141,677 A | 7/1964 | Williams |
| 3,147,013 A | 9/1964 | Tracy |
| 3,227,463 A | 1/1966 | Wiese |
| 3,527,465 A | 9/1970 | Guinard |
| 3,628,799 A | 12/1971 | Wiese |
| 3,638,957 A | 2/1972 | Marsi |
| 3,640,541 A | 2/1972 | Taschenberg |
| 3,704,019 A | 11/1972 | McHugh |
| 3,770,179 A | 11/1973 | McHugh |
| 3,804,424 A | 4/1974 | Gardner |
| 3,843,140 A | 10/1974 | Mayer et al. |
| 3,957,276 A | 5/1976 | Wiese |
| 4,099,729 A | 7/1978 | Nylykke |
| 4,142,731 A | 3/1979 | Filippov et al. |
| 4,447,063 A * | 5/1984 | Kotzur et al. ................ 277/304 |
| 4,491,331 A | 1/1985 | Salant et al. |
| 4,586,719 A | 5/1986 | Marsi et al. |
| 4,836,561 A | 6/1989 | Lebeck et al. |
| 4,887,395 A | 12/1989 | Lebeck et al. |
| 5,133,562 A | 7/1992 | Lipschitz |
| 5,137,284 A | 8/1992 | Holder |
| 5,174,584 A | 12/1992 | Lahrman |
| 5,201,531 A | 4/1993 | Lai |
| 5,385,409 A * | 1/1995 | Ide ............................. 277/400 |
| 5,498,007 A | 3/1996 | Kulkarni et al. |
| 5,529,315 A | 6/1996 | Borrino et al. |
| 5,681,395 A | 10/1997 | Werner |
| 5,702,110 A * | 12/1997 | Sedy ........................... 277/400 |
| 5,833,518 A | 11/1998 | Young |
| 5,947,481 A | 9/1999 | Young |
| 6,131,912 A * | 10/2000 | Azibert ....................... 277/358 |

* cited by examiner

Primary Examiner—Anthony Knight
Assistant Examiner—Michael W. White
(74) Attorney, Agent, or Firm—Flynn, Thiel, Boutell & Tanis, P.C.

(57) ABSTRACT

A mechanical face seal includes a pair of relatively rotatable seal rings having opposing seal faces which define a sealing region therebetween. The sealing region extends radially between the inside and outside diameters of the seal rings to seal a fluid in a sealing chamber near one diameter thereof. The seal faces are provided with hydrodynamic lift features near the sealing chamber to provide a lift load that permits a liquid between the seal faces to form a fluid film therebetween. The hydrodynamic lift features primarily function to hydrodynamically generate a hydrodynamic lift load while a plurality of concentric grooves are also provided on the seal face to serve as a leakage barrier during shaft rotation of the that prevents the liquid film from leaking across the seal faces.

19 Claims, 7 Drawing Sheets

HYDRODYNAMIC FACE SEAL WITH GROOVED SEALING DAM FOR ZERO-LEAKAGE

FIELD OF THE INVENTION

The invention relates to a mechanical seal, and more particularly, to a zero-leakage hydrodynamic face seal which prevents leakage of a fluid being sealed.

BACKGROUND OF THE INVENTION

Mechanical face seals are used on various types of machines and equipment, such as pumps, compressors and gear boxes, which have rotating shafts and a sealing chamber adjacent the shaft wherein a fluid in the sealing chamber is prevented from leaking therefrom. Such mechanical seals include a pair of adjacent seal rings having opposing seal faces which define a sealing region therebetween. One of these seal rings typically is mounted on the shaft so as to rotate therewith while the other seal ring is non-rotatably mounted on a seal housing. The fluid being sealed is disposed on one edge of the sealing region, wherein the opposing seal faces at least reduce leakage of the sealed fluid across the sealing region.

Most liquid seals operate with the seal faces rotating in contact. However, due to asperities in the seal faces, some leakage may occur. In one example, a gearbox seal has used a carbon seal ring against a hard seal ring wherein the lubricity of the carbon permitted contacting operation. However, a continuing problem has been that the carbon face often blisters when used with viscous oils wherein the raised blisters cause leakage. Many unsuccessful attempts to resolve this problem have been attempted.

In gas seals, the seal faces often are provided with grooves or recesses to generate hydrodynamic lifting forces. In this regard, the sealing faces typically separate a small distance wherein a thin film of fluid forms between the seal faces to lubricate the seal faces and reduce wear therebetween. Additionally, the grooves or recesses may pump the fluid film toward the fluid being sealed to reduce leakage of the sealed fluid.

With respect to the specific constructions of mechanical seals, a wide variety of mechanical seals have been designed and used to varying degrees of success. One mechanical seal is disclosed in U.S. Pat. No. 4,491,331 (Salant), the disclosure of which is incorporated herein in its entirety. In this mechanical seal which is used in a submersible pump, two opposed seal faces rotate in sliding contact with each other with a thin fluid film being defined between the seal faces. The seal faces define a seal which sealingly separates internal lubricant from external well fluid. A plurality of concentric annular grooves are provided on one seal face, wherein due to surface tension forces, the liquid film is prevented from leaking into the grooves.

However, in this seal, the fluid film forms hydrostatically. Accordingly, a low balance ratio was used which permits formation of the fluid film but results in a seal which can be unstable during operation.

In view of the foregoing, it is an object of the invention to overcome disadvantages associated with prior art mechanical seals and particularly the seal of U.S. Pat. No. 4,491,331.

The invention relates to a hydrodynamic face seal having a pair of coaxially aligned seal rings which are relatively rotatable during rotation of a rotating shaft. The seal rings have opposing seal faces that define a sealing region therebetween which prevents leakage of a fluid along the shaft.

At least one of the seal faces includes a plurality of concentric shallow annular grooves which preferably are disposed near the seal ring diameter that is farthest away from the fluid being sealed. The shallow grooves are separated one from the other by narrow lands which extend radially therebetween, wherein the grooves have a rectangular, triangular or curved cross-sectional profile.

The opposing seal faces preferably are flat and substantially parallel at least in the annular region having the concentric shallow grooves. Liquid is supplied to the seal faces such that, during shaft rotation, a thin film of liquid forms between the seal faces. More particularly, in the region of the concentric grooves, gases separate from the liquid and collect within the concentric grooves while the fluid film still forms in the lands due to surface tension. As a result, alternating annular bands or rings of liquid and gas are formed wherein each adjacent pair of a liquid ring and a gas ring are separated from each other by a liquid-gas interface.

It is found that each band of gas and each adjacent band of liquid are at different pressures and define a pressure drop therebetween. As such, each liquid/gas interface supports a pressure drop whereby the plurality of concentric liquid/gas interfaces effectively prevent leakage of the film liquid across the seal faces. In this regard, the last concentric groove which is farthest from the fluid being sealed has the lowest pressure which pressure is sufficiently low such that the surface tension forces acting on the liquid film in the region of this last concentric groove prevent the liquid from exiting the seal faces.

In addition to the concentric grooves, the opposing seal faces also are provided with hydrodynamic lift features radially next to the grooves. In particular, the hydrodynamic lift features are provided in the annular region that is defined radially between the concentric grooves and the edge of the sealing region that is exposed to the fluid being sealed. Examples of hydrodynamic lift features include wavy faces, slots, T-grooves and spiral grooves.

The hydrodynamic lift features provide a hydrodynamic lift which provides a stable separation of the seal faces that permits formation of the fluid film between the seal faces. Rather than the fluid film being generated solely by the static pressure of the fluid being sealed, the hydrodynamic lift features generate lift dynamically during shaft rotation to provide a lift load which is stable.

Preferably, the hydrodynamic lift features are wavy faces which do not pump the film fluid radially toward the concentric grooves but rather act circumferentially on the film liquid. However, it also will be understood that other hydrodynamic lift features may be used such as those features identified above. As discussed in further detail herein, the use of hydrodynamic lift features to generate hydrodynamic lift in the seal in combination with the use of concentric grooves to provide the primary sealing function of the seal results in a seal which is effectively non-leaking and stable.

Other objects and purposes of the invention, and variations thereof, will be apparent upon reading the following specification and inspecting the accompanying drawings.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

Figure 1:
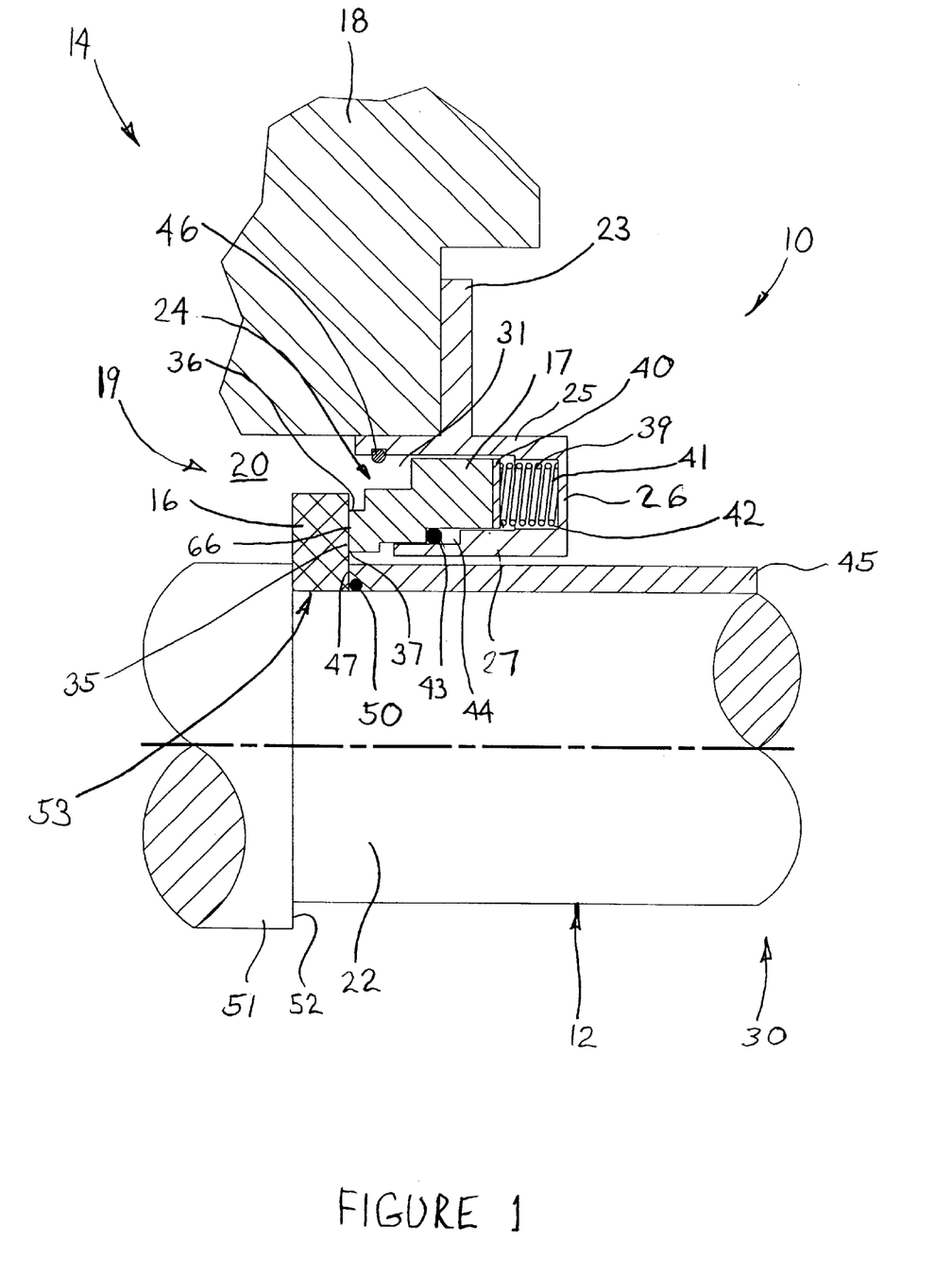
FIG. 1 is a side cross-sectional view of a liquid-application mechanical face seal having a pair of sealing rings with opposing seal faces for sealing a liquid.

Referring to FIG. 1, a mechanical face seal 10 is illustrated mounted on the rotatable shaft 12 of a machine 14. The mechanical seal 10 includes a pair of concentric seal rings 16 and 17 which operate as a rotor and a stator respectively and effectively prevent fluid leakage along the shaft 12.

Figure 2:
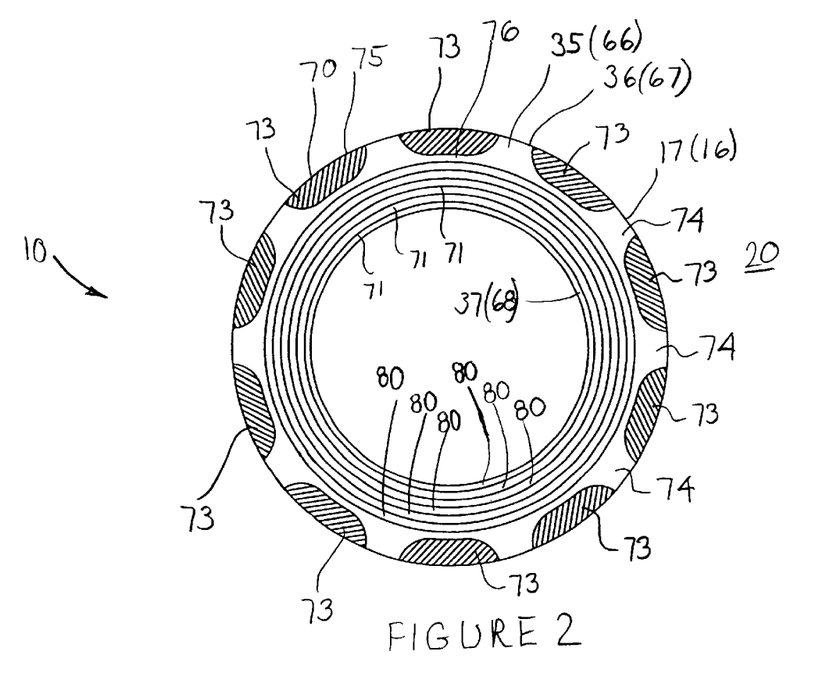
FIG. 2 is an axial end view of a first embodiment of one seal face having a plurality of concentric grooves near an inside diameter thereof and a plurality of hydrodynamic waves near the outside diameter.
Figure 4:
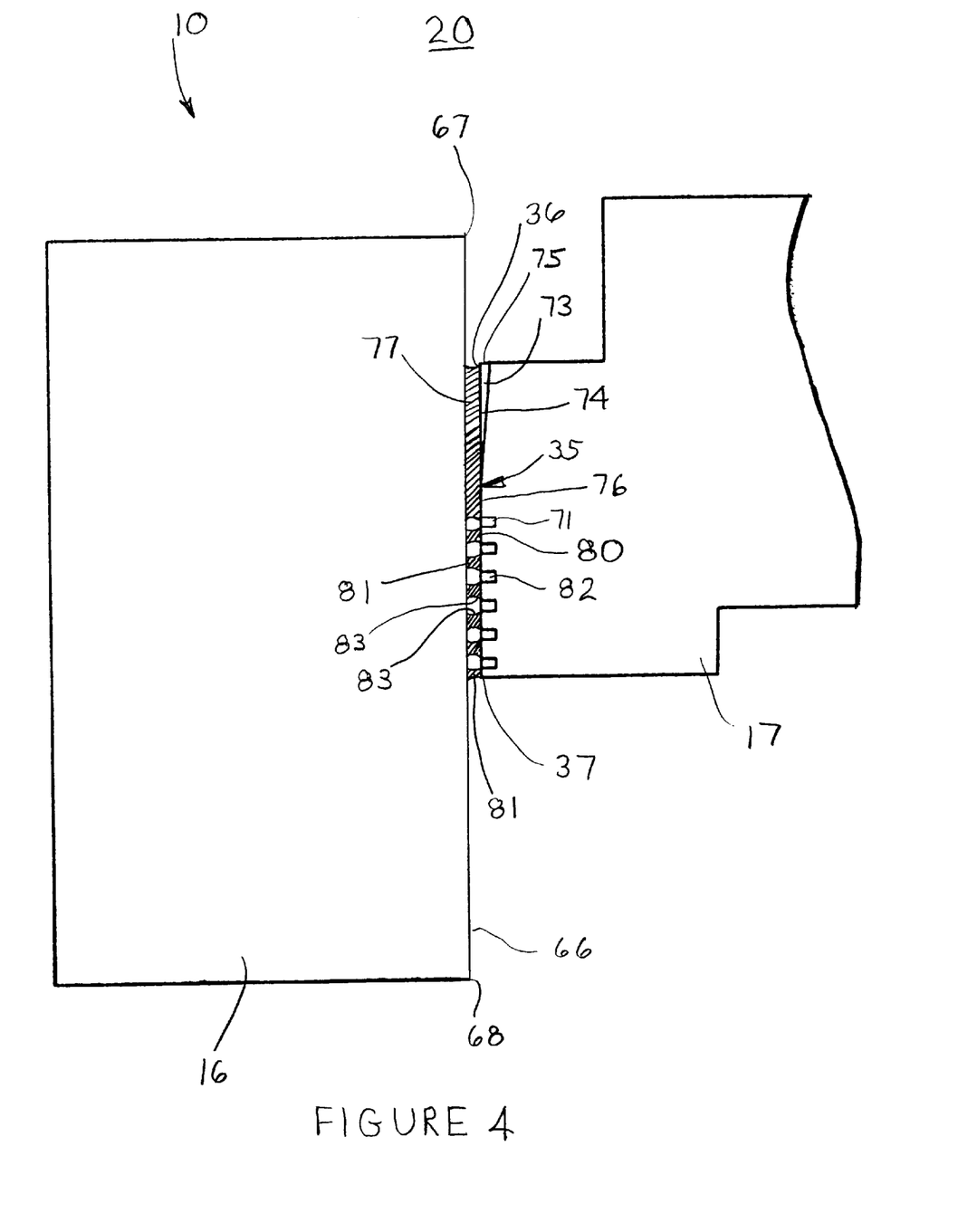
FIG. 4 is a cross-sectional view of the opposing seal rings of FIG. 2 whereby the fluid film and the alternating rings of gas and liquid thereof are illustrated between the seal faces.

The machine 14 as illustrated in FIG. 1 includes a housing 18 which defines a seal chamber 19 therein in which seal chamber 19 a fluid 20 being sealed is confined. In the embodiment of FIGS. 1, 2 and 4, the fluid 20 being sealed is oil of a gearbox although the sealed fluid may be another liquid such as pump fluid found in the impeller chamber of a pump.

The machine 14 further includes a rotating shaft 12 to which the mechanical seal 10 is mounted. The shaft 12 drives components such as gears in a gearbox and a pump or compressor impeller. The shaft 12 has a conventional circular cross section defined by an outer circumferential shaft surface 22. To prevent leakage of the fluid 20 from the seal chamber 19 along the shaft surface 22, the mechanical seal 10 is mounted on the machine housing 18 and the shaft 12 and defines a seal radially therebetween to contain the fluid 20.

The mechanical seal 10 includes an annular seal housing or cartridge 23 which mounts to the exterior face of the machine 18 and has an interior cavity 24 which opens axially through the center area of the seal housing 23. The interior seal cavity 24 opens sidewardly so as to be in fluid communication with the seal chamber 19 and thereby define an extension of the seal chamber 19.

The seal housing 23 further includes an outer wall 25, an end wall 26 which extends radially inwardly toward the shaft 12, and an inner wall 27 which is disposed proximate to but spaced radially from the outer shaft surface 22. The shaft 12 extends axially out of the seal chamber 19 and through the interior cavity 24 of the mechanical seal 10 whereby an exposed end section 30 of the shaft 12 projects outwardly past the end wall 26 for connection to a motor or other drive unit of the machine 14.

The outer and inner walls 25 and 27 which define an annular seal ring pocket 31 that opens axially toward the seal chamber 19. The seal ring pocket 31 is adapted to slidably receive the seal ring 17 therein, wherein the seal ring 17 is essentially concentric to the shaft 12.

The seal ring 17 serves as a primary ring of the mechanical seal 10, and includes a seal face 35 which extends radially between the outside and inside seal ring diameters 36 and 37. Thus, the outside diameter 36 is exposed to the liquid 20 being sealed within the chamber 24 while the inside diameter 37 is exposed to an exterior fluid. One advantage of the seal ring of the invention is that a zero-leakage seal is achieved without the use of support systems such as a system which provides a barrier gas. Accordingly, the exterior fluid for the illustrated seal typically is exterior air which defines ambient air pressure. During normal operating conditions, the fluid 20 is at a higher pressure than the ambient air pressure. It should also be understood that the exterior fluid also could be a liquid in an alternate face seal design.

The seal ring 17 is prevented from rotating relative to the seal housing 23 by drive pins which engage the outermost circumferential surface of seal ring 17, and is biased axially toward the other seal ring 16 by a plurality of circumferentially spaced apart springs 39 which project axially from the seal housing end wall 26 into the pocket 31. In particular, the outer end of each spring 39 abuts axially against an annular backing plate 40 on the back face of the seal ring 17 as illustrated in FIG. 1. The opposite inner end 41 of each spring 39 is seated in a corresponding bore 42 formed in the end wall 26. Alternate biasing members may be used besides springs.

To prevent migration of the fluid 20 along the circumferential and back faces of the seal ring 17, an O-ring 43 is provided in an annular groove 44 in the inner wall 27 to define a secondary seal. The O-ring 43 also acts to center the seal ring 17 relative to the shaft 12.

For assembly, a rigid retaining ring 46 is provided on the seal housing 23 to limit forward movement of the seal ring 17. The ring 46 confines the seal ring 17 within the housing 23.

To support the mating seal ring 16 in sealing engagement with the primary seal ring 17, a shaft sleeve 45 is non-rotatably connected to the shaft 12 so as to rotate in unison with the shaft 12. In particular, the shaft sleeve 45 has a generally tubular cross-section and has an annular end face 47 which projects radially outwardly from the shaft surface 22.

During assembly, the sleeve 45 is slidably received on the periphery of the shaft 12 and is secured in place by additional equipment components disposed adjacent thereto. The fluid 20 is prevented from leaking between the shaft sleeve 45 and the shaft 12 by an O-ring 50 which defines a secondary seal between the inner face of the shaft sleeve 45 and the outer shaft surface 22.

When secured in place, the sleeve end face 47 is spaced axially from a circumferential shoulder 51 formed on the shaft 12. The shoulder 51 has a face 52 which faces axially toward the sleeve face 47 in spaced relation to define a seal ring pocket 53 therebetween.

As to the seal ring 16, the seal ring 16 defines a mating ring which sealingly mates with the primary ring 17. During assembly, the seal ring 16 is slid axially onto the shaft 12 and abuts against the shoulder 51. The shaft sleeve 45 is then slid onto the shaft 12 wherein the seal ring 16 is confined between the faces 52 and 47.

The seal ring 16 further includes a seal face 66 which faces axially toward the opposing seal face 35 of the primary ring 17. The seal face 66 (FIG. 4) extends radially between an outside diameter 67 thereof and an inside diameter 68. As seen in FIG. 1, the seal face 66 abuts against the O-ring 50 near the inside diameter 68 to prevent leakage of the fluid 20 between the seal ring 16 and the shaft 12.

With the above-described arrangement, the seal ring 17 is non-rotatably supported in the seal housing 23 while the opposing seal ring 16 is rotatably supported on the shaft 12 so as to rotate in unison therewith. When the shaft 12 is not rotating, the opposing seal faces 35 and 66 are disposed in contacting relation due to the biasing force of the springs 39 to prevent migration of the liquid being sealed radially inwardly across the sealing region which extends radially across these seal faces 35 and 66.

During shaft rotation, the resilient spring loading of the seal ring 17 permits the seal ring 17 to be displaced axially away from the seal face 66 further into the pocket 31. Therefore, during this shaft rotation, the seal faces 35 and 66 separate slightly whereby a liquid film is defined therebetween as will be described in further detail hereinafter. Even though seal face separation is permitted, the springs 39 continue to generate an axial closing force on the seal ring 16.

In order to eliminate leakage of the fluid 20 across the seal faces 35 and 66 even when the fluid film is generated therebetween, the mechanical seal 10 is machined with a face pattern as illustrated in FIG. 2. In particular, FIG. 2 illustrates the seal face 35 of the primary seal ring 17. However, it also will be understood that this same seal face pattern may be applied to the seal face 66 of the rotating seal ring 16.

Generally as to the seal face pattern, the seal face 35 includes a plurality of hydrodynamic lift features 70 in the annular face region disposed adjacent to the outer diameter 36 thereof, and a plurality of shallow concentric grooves 71 in the annular region disposed adjacent to the inside diameter 37. The hydrodynamic lift features 70 generate hydrodynamic lift to effect separation of the seal faces 35 and 66 during shaft rotation and facilitate generation of the fluid film therebetween.

Referring to FIGS. 2 and 4, the hydrodynamic lift features 70 in the preferred embodiment are a plurality of waves 73 which are circumferentially spaced apart near the outer diameter 36. Each circumferentially adjacent pair of waves 73 is separated one from the other by flat high spots or wave peaks 74. Each peak 74 is defined by the original flat surface of the seal face 35 wherein the recessed waves 73 are formed in the seal face 35 by removing material therefrom. As such, each wave 73 is recessed into the face 35 to define a low spot or valley therein. Other than the recesses which define the waves 73, the seal face 35 preferably has a uniformly flat or planar surface which extends radially between the outer diameter 36 and the inside diameter 37 through the regions of the wave peaks 74 and the concentric grooves 71.

Each wave 73 has the greatest depth at the outside diameter 36 such that the outer edge 75 of each wave 73 opens radially in communication with the fluid 20 being sealed. The waves 73 are progressively shallower in the radial direction away from the outer edge 75 so as to have a progressively decreasing amplitude. At the shallow inner ends of the waves 73, an annular intermediate land 76 is defined which separates the waves 73 radially from the concentric grooves 71.

This annular wavy face region generally is defined radially by the outside diameter 36 and the intermediate land 76 and receives the fluid 20 being sealed which fluid is a liquid as referenced above. The liquid 20 is received in the waves 73 such that the waves 73 generate hydrodynamic lift between the seal faces 35 and 66 which overcomes the spring closing force and hydrostatic closing forces. The hydrodynamic lifting force promotes separation of the seal faces 35 and 66 whereby a liquid film 77 is defined between the axially separated seal faces 35 and 66.

In the illustrated embodiment of FIG. 2, ten waves 73 are provided. However, the lift characteristics of the seal rings 16 and 17 can be varied by varying the quantity and dimensions of the waves 73.

Generally as to the function of the waves 73, the fluid film thickness is generally wavy in the circumferential direction so as to have a greater thickness in the valleys of the waves 73 and a thinner thickness in the region of the wave peaks 74. During shaft rotation whereby the opposing seal faces 35 and 66 rotate relative to each other, the sliding movement of the seal faces 35 and 66 results in the waves 73 promoting hydrodynamic lubrication between the seal faces and providing hydrodynamic lift to the seal faces.

These waves 73 are similar to the waves disclosed in U.S. Pat. Nos. 4,836,561, 4,887,395, 5,833,518 and 5,947,481 wherein the disclosure of these patents is incorporated herein in their entirety by reference.

The waves 73 of the invention, however, only extend radially across a portion of the seal face to serve the function of generating hydrodynamic lift. A wavy face seal region is preferred as the hydrodynamic lift feature 70, in particular, due to the fact that the waves 73 primarily act circumferentially on the liquid film 77 and do not pump the film liquid radially towards the concentric grooves 71, the significance of which is discussed in further detail hereinafter. Further, the waves 73 are operational in both directions of shaft rotation so that the seal 10 is bi-directional.

In addition to the hydrodynamic lift features, a plurality of concentric grooves 71 is provided to serve the primary sealing function of the seal faces 35 and 66 particularly during shaft rotation. In the illustrated arrangement, six shallow concentric grooves 71 are defined in the seal face 35 radially inwardly of the hydrodynamic lift region.

Referring to FIG. 4, the rectangular cross-sectional shape of the six concentric grooves 71 is illustrated, although for clarity only the interior one of the six grooves 71 is labeled with reference numeral 71. It will be understood that each of the grooves is essentially identical except for the progressively decreasing radiuses of the grooves 71.

In the illustrated embodiment, the six grooves 71 are provided wherein each groove 71 has a radial groove width of 0.002 inches and each land 80 between adjacent pairs of grooves 71 has a radial land width of 0.004 inches. Further, the grooves 71 have a nominal groove depth of 0.0005 inches. This particular seal construction was tested on a gearbox seal under the following conditions: speed—20,000 rpm; seal chamber pressure—10 to 15 psig; inside diameter pressure-atmospheric; seal fluid-ISO 32 gearbox oil; temperature-145 degrees Fahrenheit; test duration—160 hours; and special operation conditions—40 starts and stops. The seal ring 17 was formed of silcon carbide and the other seal ring 16 was formed of tungsten carbide. The test seal had: face OD=1.8 inches; face ID=1.569 inches; wave ID=1.675; and ID of first surface tension groove=1.629 inches. This test seal was found to have no measurable gearbox oil leakage over the length of the test and an excellent face condition thus indicating excellent wear durability. Hard/hard faces were therefore used and blistering of carbon was eliminated.

This result is significant in that a zero-leakage gearbox seal was used successfully, which would overcome the problems with known contacting gearbox seals. As discussed previously, numerous attempts were made to provide a single seal for gearbox applications which did not have the blistering problems associated with known seals. In this regard, the inventive seal 10 provides a zero-leakage single seal with atmosphere on side thereof which does not require support systems such as those used on double seals for other applications.

With respect to the seal gap or film thickness, this thickness will vary depending on the hydrodynamic lift load and the closing forces. Preferably, the seal gap is greater than about 0.00002 inches (0.5 microns) and less than about 0.0001 inches (2.5 microns) which will give lift-off of seal faces and avoid negative contact of surface asperities.

The land and groove widths thereby may be varied depending upon the expected operating conditions which can vary the seal gap. Preferably, the land and groove widths are greater than the film thickness by several times and preferably, by at least five times. This parameter depends upon the radius of the meniscus at each liquid/gas interface due to surface tension, wherein land width should be sufficiently large to enable establishment of a meniscus.

It will be understood that the illustrated arrangement of six grooves 71 is depicted for illustrative purposes. The actual depth and radial width of each groove 71 and the radial width of the land 80 defined between each adjacent pair of grooves 71 can be varied to vary the overall number of grooves 71 and the amount of radial separation therebetween. These dimensional variables depend upon the manufacturing process used to form the waves 73 and grooves 71 in the seal faces and the pressure differential which the seal 10 will operate under.

For example, the concentric grooves and hydrodynamic lift features preferably are formed by the laser machining process disclosed in co-pending U.S. Provisional Patent Application No. 60/215 981, entitled SEAL RING AND METHOD OF FORMING MICRO-TOPOGRAPHY RING SURFACES WITH A LASER, filed Jul. 5, 2000, the disclosure of which is incorporated herein in its entirety. This provisional patent application is being assigned to the same assignee as the present application.

With this laser machining process, the two different face features, namely the concentric groves 71 and the waves 73 can be formed during one manufacturing cycle. The waves 73 are formed by the process disclosed in the above patent application while the grooves 71 are formed preferably by a second laser mask having a smaller opening than used for the waves 73 although a single laser mask could be used for both the grooves 71 and waves 73. The laser machining process permits much smaller grooves to be formed such that a large number of concentric grooves may be provided to increase the ability of the concentric grooves to resist fluid migration.

More particularly as to the operation of the concentric grooves 71 as illustrated in FIG. 4, the liquid film 77 during shaft rotation is defined between the separated seal faces 35 and 66, wherein the liquid film 77 is supplied by the liquid 20 being sealed. In this regard, the higher fluid pressure drives fluid 20 into the seal faces and thereby charges the seal faces with liquid. Preferably, the seal liquid 20 is a non-volatile liquid wherein vapor pressure is less than one atmosphere.

The liquid film 77 extends radially across substantially the entire radial width of the sealing region between the inside diameter 37 of the seal ring 17 and the outside diameter 36. The radially outer section of the sealing region has a fluid film which is thicker in the area of the waves 73 than the area of the high spots 74 which are disposed between circumferentially adjacent pairs of waves 73. In this radially outer region, the film 77 extends radially uninterrupted or continuous, and the waves 73 thereby provide hydrodynamic lift to the seal faces 35 and 66.

However, in the region of the concentric grooves 71 disposed along the seal face 35 near the inside diameter 37, a leakage barrier is formed by the concentric grooves 71 which prevents liquid 20 from migrating radially inwardly across the seal faces.

In the region of the concentric grooves 71, however, the axial spacing between the seal faces 35 and 66 has a variable depth. In the areas with the smallest depth, namely the regions of the lands 80, the surface tension results in rings of liquid film 81 being formed wherein the liquid rings 81 extend axially between the seal face 66 and the opposing land face 80. However radially adjacent thereto, the concentric grooves 71 have a greater depth which reduces the effect of the surface tension. As a result of the concentric grooves 71 being provided, vapor or gases, which usually are carried in the liquid 20, separate from the liquid film and collect within the grooves 71 under rotating conditions to thereby define an annular gas pocket or ring 82 in each groove 71. These gas pockets 82 define annular bands of gas 82 as illustrated in FIG. 4. Therefore, during shaft rotation, alternating rings of liquid and gas are formed with liquid-gas interfaces 83 defining the common boundaries therebetween.

It is believed that the liquid rings 81 and gas rings 82 have a pressure drop therebetween wherein each of the liquid-gas interfaces 83 supports a small pressure drop of typically 2–5 psi. The pressure drop varies depending on the film thickness and fluid surface tension. The pressure drop is inversely proportional to the gap size and proportional to the surface tension of the fluid.

These liquid/gas interfaces effectively eliminate leakage through the annular region of the concentric grooves 71 whereby the grooves 71 define a barrier to liquid leakage during shaft rotation. The hydrodynamic lift features 70 operate simultaneously with the concentric grooves 71 during shaft rotation to provide hydrodynamic lift to effect a separation of the seal faces 35 and 36 and facilitate formation of the fluid film 77 therebetween. This hydrodynamic lift permits higher balance ratios to be provided which provides seal stability during operative conditions.

The wavy face features are preferred since any fluid effects caused thereby effectively act circumferentially, generally parallel to the annular bands of film liquid and gas. While the film liquid may have some tendency to migrate radially due to the radial pressure gradient between seal chamber pressure and ambient pressure, the circumferential lift feature of the wavy face minimizes any additional radial pressure on the film liquid. This is desirable since a hydrodynamic lift feature which generates an additional radial pressure would require that the concentric grooves 71 be designed to compensate for the added radial pressure. Notwithstanding, it also is understood that the concentric grooves could be designed to compensate for such radial pressure, for example, by increasing the number of concentric grooves. Thus, spiral grooves are one alternate to waves whereby the pumping of these grooves would generate a hydrodynamic radial pressure that would be compensated for by providing additional concentric grooves.

While the above-described embodiment has the hydrodynamic lift features 70 and the concentric grooves 71 located in the stationary seal face 35 of the stationary seal ring 17, these face features also may be provided in the opposing rotating seal face 66. Preferably, the hydrodynamic lift features 70 and concentric grooves 71 are formed in the harder seal ring although this is not required. Both rings 16 and 17 could be formed of hard material. Furthermore, while the seal 10 preferably operates in non-contacting mode, it also should be understood that during certain operating conditions such as at startup, the seal faces typically operate in contact.

Figure 3:
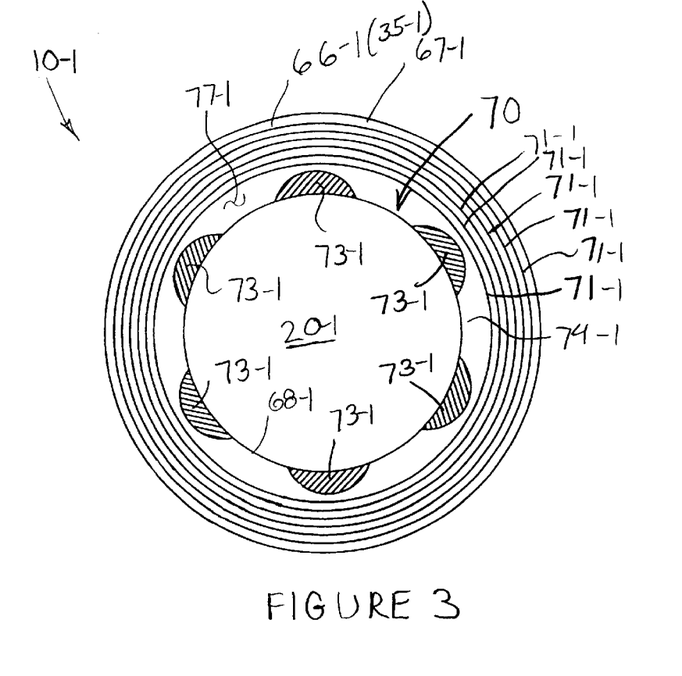
FIG. 3 is an axial end view of a second embodiment of the seal ace having the concentric grooves disposed near the outside diameter and a plurality of hydrodynamic waves near the inside diameter.

Additionally, as illustrated in FIG. 3, a seal 10-1 may be constructed so that the fluid 20-1 being sealed is located at the inside diameter 68-1 rather than the outside diameter 67-1. In this alternate arrangement, therefore, the hydrodynamic lift features, namely the waves 73-1 are defined at the inside diameter 68-1 of the seal ring face 66-1 (or the seal ring face 35-1), whereby the waves 73-1 and grooves 71-1 are structurally and functionally identical to the waves 73 and grooves 71 described above except for the different radial positions. Therefore, the waves 73-1 generate the liquid film 77-1 near the inside diameter 68-1 while the concentric grooves 71-1 generate a leakage barrier outwardly therefrom.

Figure 5:
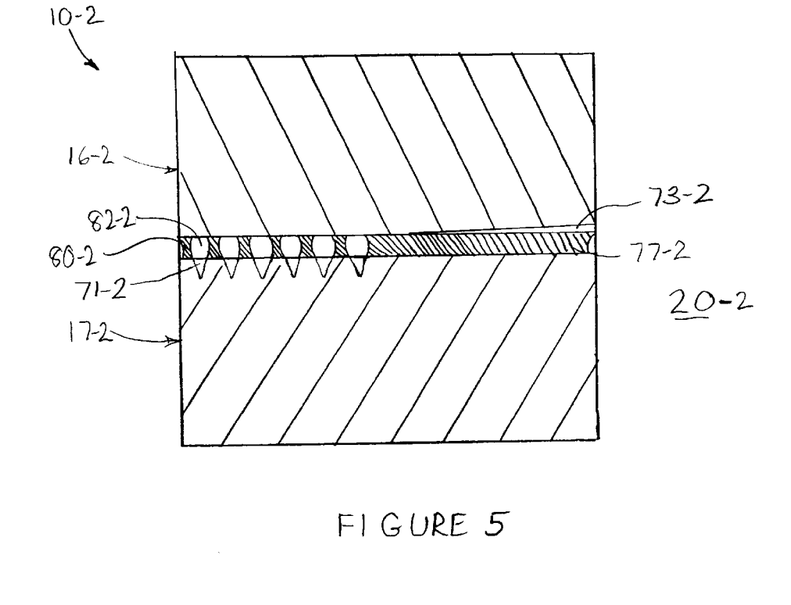
FIG. 5 is a side cross-sectional view of a third embodiment of the seal rings turned on end for illustrative purposes.

Referring to FIG. 5, a further alternate seal 10-2 is illustrated. In this arrangement, the waves 73-2 are provided on the seal ring 16-2 near the diameter that is adjacent to the fluid 20-2 being sealed, while the grooves 71-2 are formed in the seal ring 17-2 near the opposite diameter. A further modification is illustrated wherein the grooves 71-2 have a triangular cross-section. This arrangement forms a liquid film 77-2 having the same characteristics as the fluid films discussed above including annular rings of gas 82-2 and liquid 80-2.

Figure 6A:
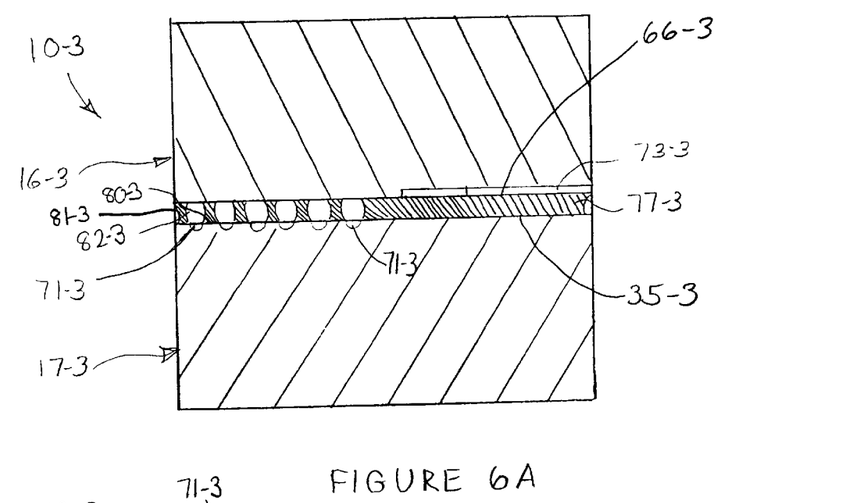
FIG. 6A is a side cross-sectional view of a fourth embodiment of the seal rings turned on end.

Still further, another alternate seal 10-3 is illustrated in FIG. 6 wherein the hydrodynamic lift features 73-3 and the concentric grooves 71-3 are in the same positions on the seal rings 16-3 and 17-3 as discussed previously with respect to FIG. 5. However, the hydrodynamic lift features 73-3 are illustrated as T-grooves, while the concentric grooves 71-3 have a semi-circular cross-section. Again, this arrangement generates a similar fluid film 77-3 having gas rings 82-3 and liquid rings 80-3 wherein the T-grooves primarily act circumferentially on the liquid film and are bi-directional.

Figure 6B:
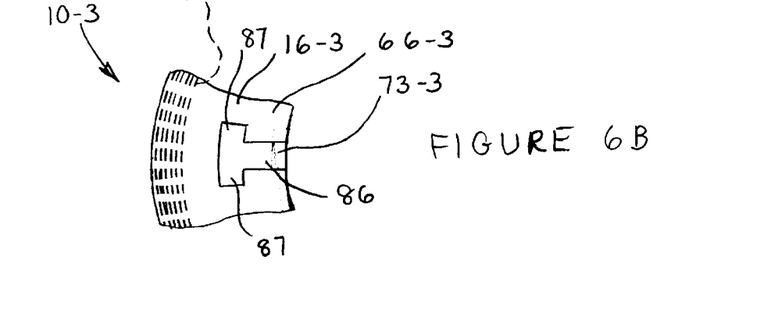
FIG. 6B is an enlarged partial view of a seal face of the seal rings of FIG. 6A.

A representative T-groove 73-3 is illustrated in FIG. 6B on seal face 66-3 radially adjacent to thee concentric rings 71-3 (illustrated in phantom outline) on the opposing seal face 35-3. Each T-groove 73-3 includes a radial leg 86 and circumferential legs 87.

With respect to the above-described embodiments, a face seal which is particularly suitable for liquid applications is disclosed. In these arrangements, the fluid 20 being sealed is a liquid which is the liquid that is also supplied to the seal faces 35 and 66.

Figure 7:
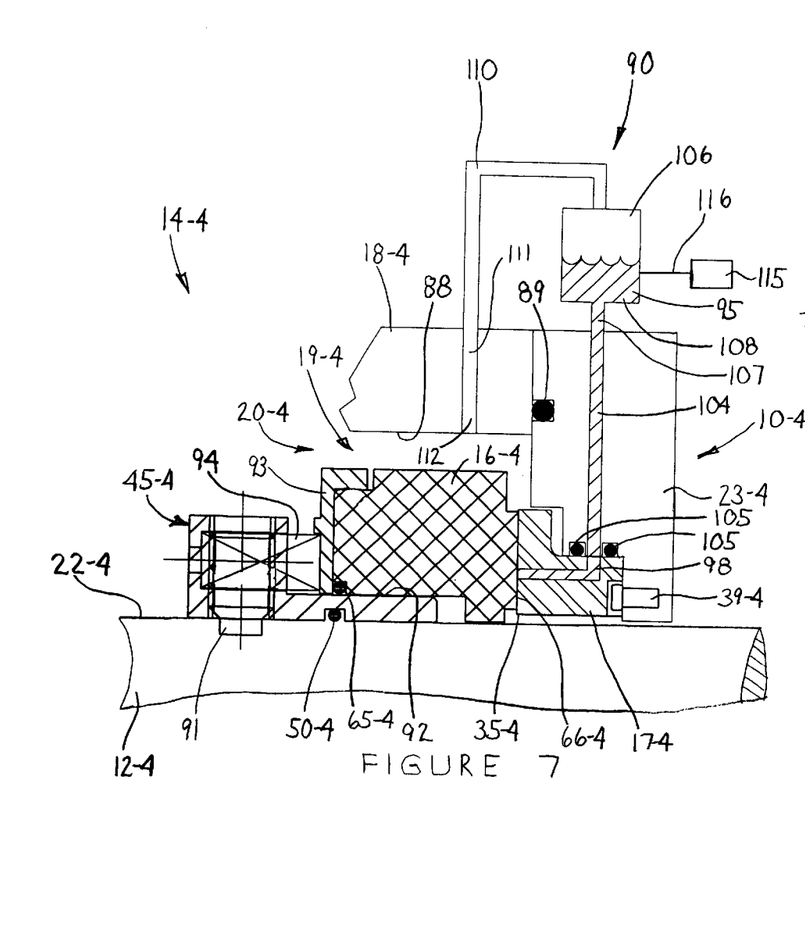
FIG. 7 is a cross-sectional view of a gas-application mechanical seal which is adapted for sealing a gas.
Figure 8:
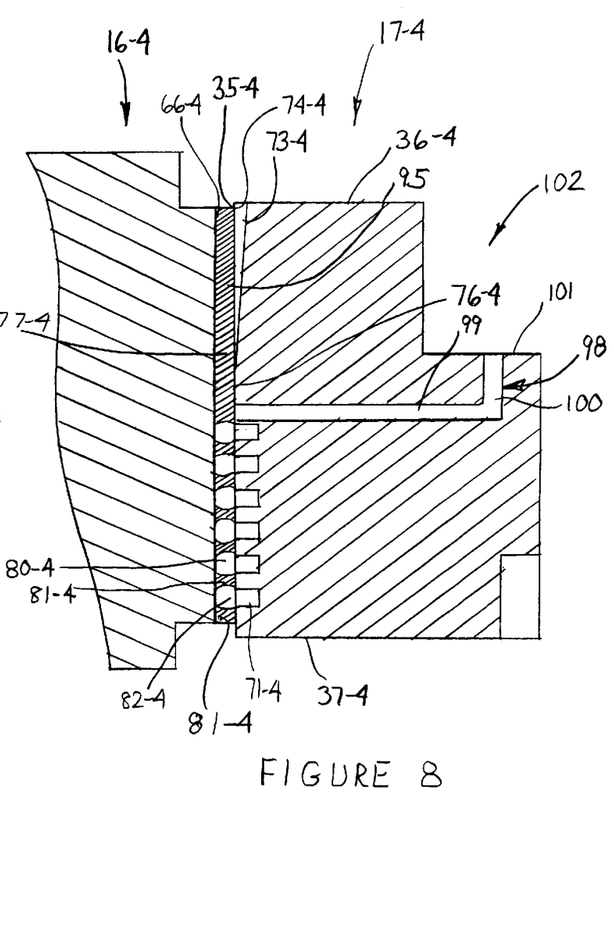
FIG. 8 is a side cross-sectional view of the opposing seal rings of the mechanical seal of FIG. 7.

However, FIGS. 7 and 8 illustrate a seal arrangement 10-4 which is designed for gas applications. In such an application, the fluid 20-4 being sealed within the sealing chamber 19-4 is a gas, such that the seal arrangement 10-4 includes a liquid film supply system 90 to supply a film liquid to the seal faces 35-4 and 66-4.

More particularly, the machine 14-4 to which the seal 10-4 is mounted includes the machine housing 18-4, wherein the machine housing 18-4 defines a sealing chamber 19-4 radially between an interior housing surface 88 and the outside surface 22-4 of a rotating shaft 12-4.

The seal 10-4 includes a seal housing 23-4 that is fastened to an end face of the machine housing 18-4. The fluid 20-4 is prevented from leaking between the seal housing 23-4 and the machine housing 18-4 by an O-ring 89. The seal 10-4 structurally and functionally is same as the seal 10 and thus, common components are identified by the same reference numeral with the suffix "-4" associated therewith. Accordingly, a detailed description of these common components is not required.

With respect to the seal 10-4, a stationary seal ring 17-4 is non-rotatably connected to the seal housing 23-4 by pins 39-4. The seal face 35-4 thereof is disposed in opposing relation to the seal face 66-4 of the second rotatable seal ring 16-4.

A shaft sleeve 45-4 is fixed to the shaft 12-4 by set screws 91 which are threaded radially through the shaft sleeve 45-4. The seal ring 16-4 is seated on a shoulder 92 so as to be axially slidable therealong. The back face of the seal ring 16-4 is received within an annular seal ring holder 93 and is biased axially toward the opposing seal ring 17-4 by a plurality of springs 94. O-rings 50-4 and 65-4 prevent leakage of the fluid 20-4 along the shaft sleeve 45-4 and the back face of the seal ring 16-4 respectively. This arrangement is structurally and functionally similar to the embodiment of FIG. 1 in that the seal faces are separable during shaft rotation, although in this arrangement the rotating seal ring 16-4 is axially slidable rather than the seal ring 35 (FIG. 1).

Referring to FIG. 8, the seal ring 17-4 is provided with a plurality of concentric grooves 71-4 which are located near the inside diameter 37-4 similar to the seal arrangement of FIG. 2. The concentric grooves 71-4 have a substantially rectangular cross-section although other cross-sectional shapes such as those illustrated in FIGS. 5 and 6 may be used.

Further as to the seal ring 17-4, circumferentially spaced apart hydrodynamic lift features, namely waves 73-4 are provided therein near the outside diameter 36-4 thereof. This arrangement is similar to the arrangement illustrated in FIG. 2 wherein the grooves 71-4 and the waves 73-4 are provided on the same seal ring. Pursuant to the above description, it also will be understood that the grooves 71-4 and the waves 73-4 may be provided on different seal rings like FIGS. 5 and 6. In either case, the radially outermost concentric rings 71-4 and the radial innermost extent of the waves 73-4 are radially spaced apart to define an intermediate land region 76-4 therebetween.

Preferably, the seal ring 17-4 is a hard material, namely silicon carbide and the seal ring 16-4 is carbon. Other materials also may be used.

To permit formation of a liquid film 77-4 therebetween and form the annular rings of gas 82-4 and liquid 81-4, the liquid supply system 90 is arranged so as to supply a liquid 95 directly to the seal faces 35-4 and 66-4. In the illustrated arrangement, the liquid 95 is supplied to the intermediate land region 76-4 which liquid 95 cooperates with the concentric rings 71-4 and the waves 73-4 to perform the same sealing function in the same manner as discussed above with respect to the embodiments of FIGS. 1–6. Alternately, the liquid 95 may be supplied at various locations to charge the seal faces such as into the wave 73-4 or the high spot 74-4, or even to the outer diameter.

The liquid supply system 90 includes at least one seal ring passage 98 which has an axial portion 99 that opens into the intermediate land region 76-4 (or alternatively to the wave 73-4 or high spot 74-4 as referenced above) through the seal face 35-4 and extends axially away from the seal face 35-4. The seal ring passage 98 also includes a radial extension 100 which opens radially outwardly from a circumferential surface 101 of a stepped section 102 of the seal ring 17-4. The passage 98 also could extend at angle away from the seal face 35-4, or extend axially out the back face of the seal 17-4.

As to the illustrated embodiment, the radial extension 100 communicates with an intermediate passage 104 which extends radially through the seal housing 23-4. The inner end of the intermediate passage 104 is in fluid communication with the radial extension 100 wherein the liquid 95 is prevented from leaking therefrom by a pair of O-rings 105 which straddle the two passages 100 and 104. Further, the O-rings 105 prevent leakage of the sealed fluid 20-4 along the back face of the seal ring 17-4.

The liquid supply system 90 further includes a reservoir 106 which is disposed exteriorly of the seal housing 23-4. The reservoir 106 has a connector pipe 107 which is connected to and opens into the intermediate passage 104. The bottom end of the reservoir 106 includes a quantity 108 of the fluid 95 whereby the fluid 95 flows sequentially through a liquid supply passage defined by the pipe 107 and the passages 104 and 98 to supply the fluid 95 to the seal faces 35-4 and 66-4.

To facilitate this flow, the reservoir 106 is pressurized, preferably by the gas fluid 20-4 being sealed. A bladder or piston may be provided between the gas 20-4 and liquid 95. As such, the pressure of the liquid fluid 95 is always equal to the gas fluid being sealed 20-4. More particularly, the liquid supply system 90 includes an inlet pipe 110 which is open at one end to the reservoir 106 and is connected to a passage 111 formed in the machine housing 18-4. The passage 111 has an inner end 112 which opens into the fluid chamber 19-4. The gas fluid 20-4 thereby pressurizes the film liquid 95 and since these pressures are equal, the film liquid 95 tends to remain between the seal faces 35-4 and 66-4 due to the surface tension therebetween.

If any leakage of the film liquid 95 does occur or evaporation of the liquid 95 occurs, the fluid supply system 90 also may include a makeup unit 115 which provides makeup liquid to the reservoir 106 through a supply pipe 116.

With this arrangement, the seal 10-4 is readily usable with a gas application. Specifically, a liquid film 77-4 is formed between the seal faces 35-4 and 66-4 to generate an annular hydrodynamic lift region near the outside diameter due to the waves 73-4 and a leakage barrier here the inside diameter due to the concentric grooves 71-4.

In operation, a pair of the opposing seal faces 35 and 66 (or the variations thereof illustrated in FIGS. 3–8), is provided with a fluid film between the seal faces. In particular, the opposing seal faces include hydrodynamic lift features which effect separation of the seal faces during shaft rotation which lift features such as the wave features illustrated herein cause separation of the seal faces a slight amount and permit a fluid film to extend radially across the entire seal face. However, at least one of the seal faces includes a plurality of concentric annular grooves which are radially spaced apart from each other and define a fluid barrier which prevents leakage of the fluid film and the fluid being sealed by the mechanical seal. As discussed herein, gas or vapor within the film fluid separates therefrom during shaft rotation and collects in annular bands of gas in the regions of the concentric grooves. At the same time, surface tension forces cause formation of annular bands of liquid in the regions of the seal face lands that are disposed radially adjacent to each concentric groove. Alternating bands of the liquid and gas are formed during shaft rotation whereby each liquid-gas interface supports a pressure drop therebetween. As such, the concentric grooves define an annular barrier during shaft rotation which prevents radial migration of the film fluid across the seal faces and accordingly, prevent the seal from leaking. At the same time, the hydrodynamic lift features effect separation of the seal faces to facilitate formation of the fluid film and provide a stable operating seal.

In the embodiments illustrated in FIGS. 1–3, the film fluid is supplied by the fluid being sealed within the seal chamber wherein the hydrodynamic lift features also facilitate charging of the seal faces with the sealed fluid. Alternatively as illustrated in FIGS. 7 and 8, the liquid film fluid also may be provided by a separate fluid supply system which is particularly suitable for gas applications.

Figure 9:
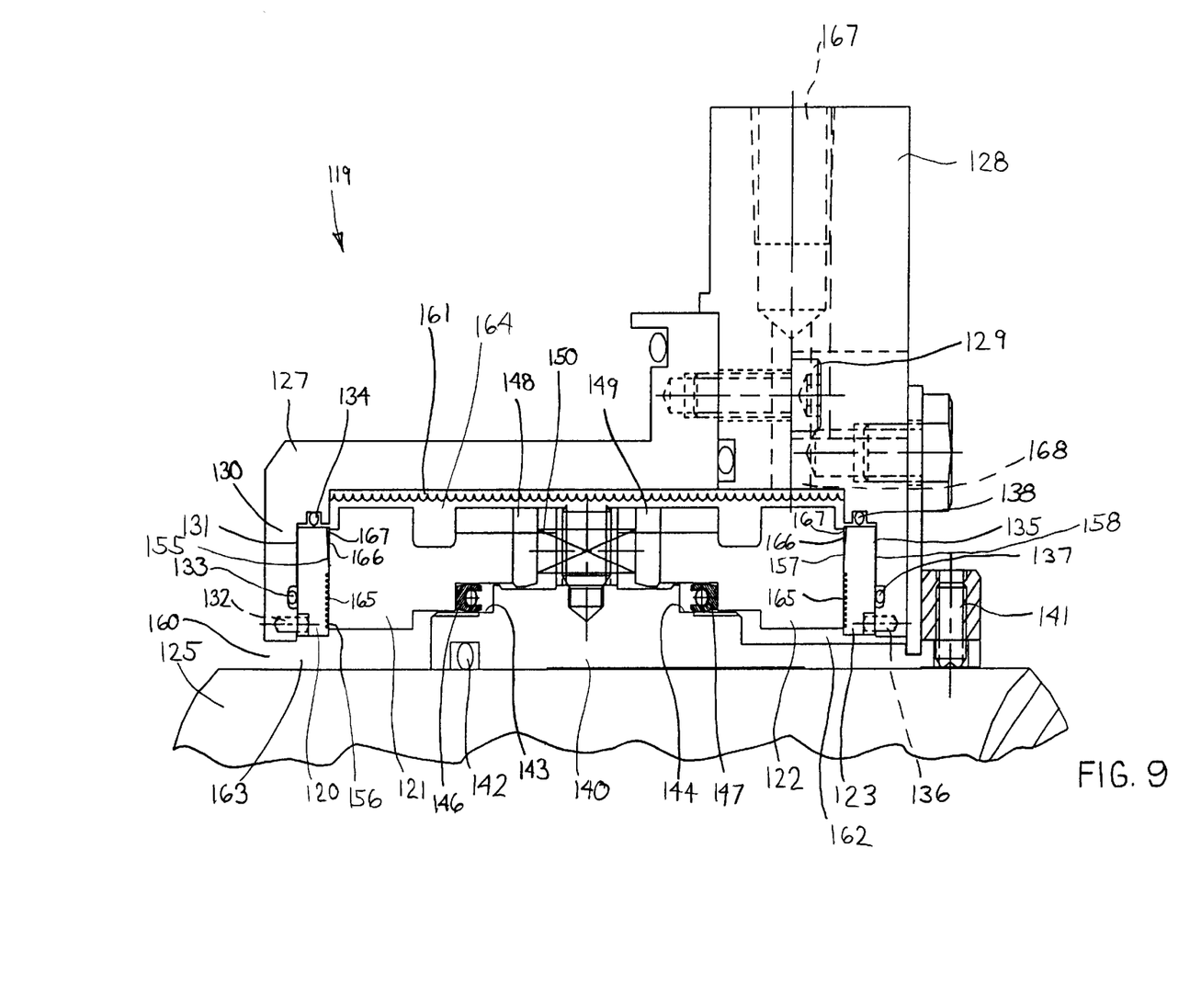
FIG. 9 is a cross-sectional view of a mechanical seal for gas and liquid applications in a double seal configuration
Figure 10:
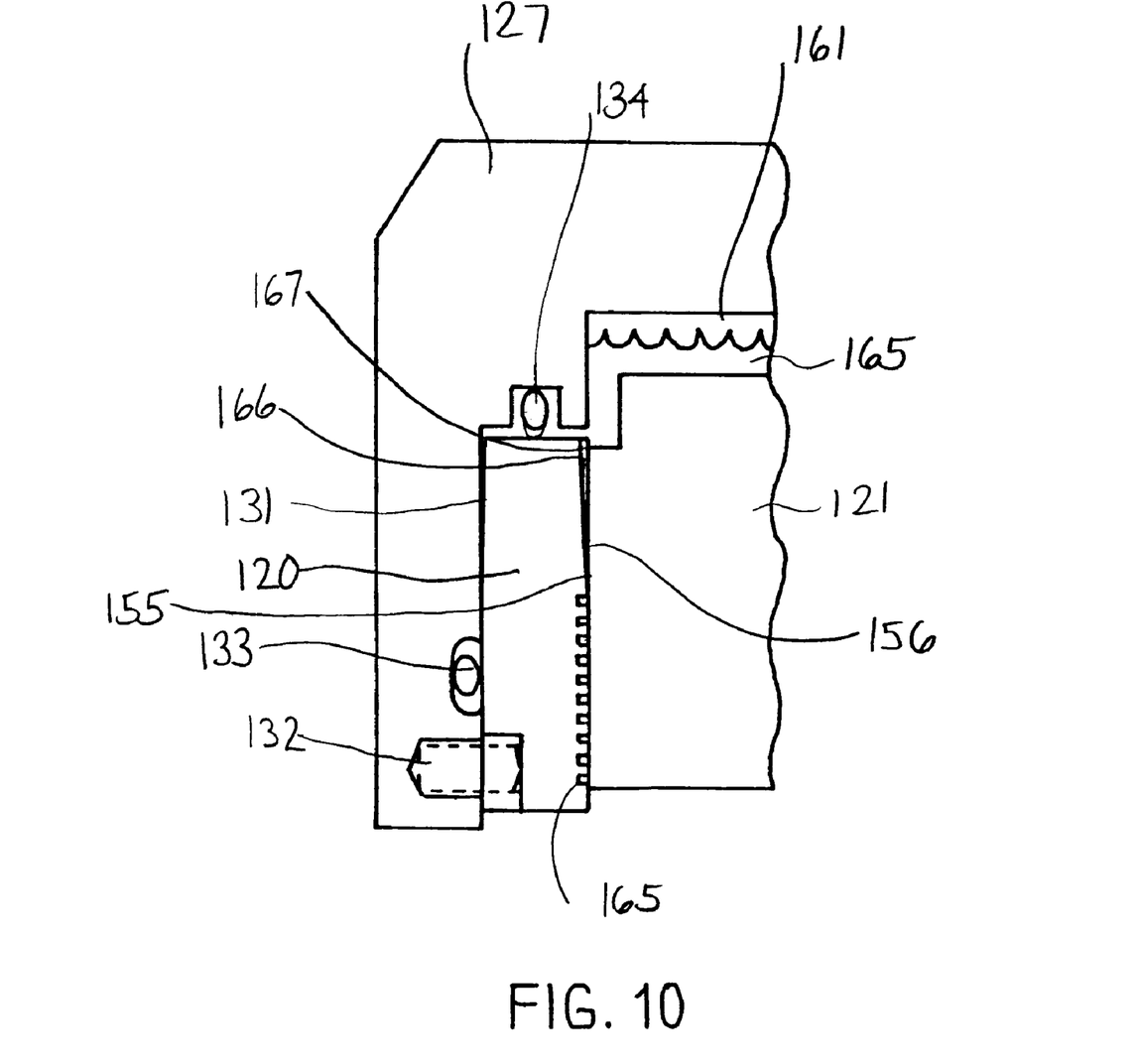
FIG. 10 is a side cross-sectional view of the opposing sea rings of FIG. 9.

Referring to FIGS. 9 and 10, a still further embodiment of the invention is illustrated in a double seal configuration. This double seal 119 includes two pairs of seal rings, namely inboard seal rings 120 and 121 and outboard seal rings 122 and 123. As discussed in further detail herein, the stationary seal rings 120 and 123 are formed identical to each other and remain stationary during seal operation. The other seal rings, namely rotating seal rings 121 and 122 are formed identical to each other and are fixedly connected to the shaft 125 so as to rotate therewith.

To support the seal rings 120 and 123, the double seal 119 includes an inner first seal housing 127 and an outer second seal housing 128 which are rigidly joined together by bolts 129. The inner seal housing 127 has an end wall 130 which defines a ring seat 131 in which the seal ring 120 is seated. The seal ring 120 is nonrotatably connected to the inner seal housing 127 by pins 132 whereby leakage of fluid along the back face of the seal ring 120 is prevented by O-ring 133. O-ring 134 is provided for centering the seal ring 120.

Similarly, the other stationary seal ring 123 is seated within a ring seat 135 of the outer seal housing 128 and is non-rotatably connected thereto by pins 136. Leakage along the back face of the seal ring 123 is prevented by O-ring 137. O-ring 138 is provided for centering seal ring 123.

The seal 119 further includes a shaft sleeve 40 which is non-rotatably connected to the shaft 125 by set screws 141 wherein leakage is prevented along the shaft surface by O-ring 142. To support the seal rings 121 and 122, the shaft sleeve 140 further includes shoulders 143 and 144. Each of the shoulders 143 and 144 slidably supports the respective rotating seal rings 121 and 122 thereon wherein spring energized PTFE, annular secondary seals 146 and 147 are provided to prevent leakage between the seal rings 121 and 122 and the shaft sleeve 140. With this arrangement, the seal rings 121 and 122 are slidable axially along the shoulders 143 and 144.

The seal rings 121 and 122 also include respective backing plates 148 and 149 on the back faces thereof wherein circumferentially spaced apart coil springs 150 are compressed between the backing plates 148 and 149. As a result, the seal rings 121 and 122 are biased axially away from each other into sealing contact with the respective seal rings 120 and 123.

Specifically, the inboard seal rings 120 and 121 include opposing seal faces 155 and 156 which cooperate to define a seal region extending radially therebetween. Similarly, the outboard seal rings 122 and 123 include seal faces 157 and 158 which also define a radial sealing region, wherein the opposed seal faces of each pair of seal rings permits relative rotation therebetween during rotation of the shaft 125.

With this arrangement, the double seal 19 includes: a seal chamber 160 defined radially inwardly of the inboard seal rings 120 and 121; a barrier fluid chamber 161 which is disposed radially outwardly of and extends axially across both pairs of seal rings; and an ambient chamber 162 disposed radially inwardly of the seal rings 122 and 123.

With respect to these chambers, the seal chamber 160 includes a fluid 163 being sealed which typically will be a gas or liquid such as in a compressor, mixer or pump. As for the outer chamber 162, exterior air and ambient pressure typically is present in this area. As for the barrier fluid chamber 161, a barrier fluid 164, namely a liquid, is provided within this chamber 161 as will be described in greater detail herein.

The barrier fluid 164 is supplied to the barrier fluid chamber 161 by an inlet port 167 which opens radially into the barrier fluid chamber 161 through an inner opening 168. It is known to provide a barrier fluid chamber with a barrier liquid through an inlet and in this regard, the inlet 167 of the present invention is connected to a barrier fluid supply system, a detailed description of the supply system not being necessary.

The barrier fluid 164 entirely surrounds the seal rings 120–123 over the outer diameters thereof and supplies the liquid for the fluid film which forms between the seal faces. Referring to FIG. 10, a representative pair of the seal rings, namely inboard seal rings 120 and 121 is illustrated therein. It will be understood that the outboard pair of seal rings 122 and 123 is formed substantially identical thereto and operates in the same manner as the inboard seal rings 120 and 121 described hereinafter.

More particularly, the seal face 155 of the stationary seal ring 120 includes a plurality of concentric grooves 165, ten (10) of these grooves 165 being illustrated in FIG. 10. Additionally, the seal face 155 includes an outer face region of hydrodynamic lift features 166 which in the illustrated embodiment comprise waves 167. The concentric grooves 165 and the hydrodynamic lift features 166 operate substantially identical to the face features illustrated in FIGS. 1 and 4, the primary difference being that the embodiment of FIG. 1 is a single seal wherein the film liquid which migrates into the seal faces is supplied from the seal chamber 20, while the liquid film in the embodiment of FIGS. 9 and 10 is provided from the barrier fluid chamber 161. A detailed description of the operation of the concentric grooves 165 and 166 is not necessary in view of the detailed discussion already provided above. Generally, it will be understood that relative rotation of the seal faces 155 and 156 results in a lift force being generated by the hydrodynamic lift features 166 to separate the seal faces 155 and 156 while the concentric grooves 165 permit formation of annular bands of liquid and gas that prevent migration of the buffer fluid 165 radially inwardly into the seal chamber 160.

The outboard pair seal rings 122 and 123 also include concentric grooves 165 and hydrodynamic lift features 166, namely waves 167 that prevent migration of the barrier fluid 165 radially inwardly into the ambient chamber 162. As a result, the barrier fluid 165 is supplied to the barrier fluid chamber 161 to charge the opposing seal faces with the film liquid.

For lower speed equipment such as mixers, the barrier fluid 164 typically does not circulate. However, at increased speeds, heat may build up due to liquid shearing. Thus, an outlet port, similar to the inlet port 167, may be provided to allow circulation of the barrier fluid 164 into and out of the barrier fluid chamber 161 and through a cooling device.

The arrangement of FIGS. 9 and 10 provides an alternate double seal arrangement whereby the film liquid is supplied by a barrier fluid 165 rather than product fluid provided from the seal chamber. This arrangement is a further alternate mechanical seal that is usable for both gas and liquid applications.

With the above disclosed embodiments, a stable zero-leakage seal is provided which effectively eliminates fluid leakage while minimizing wear on the seal faces.

Although particular embodiments of the invention have been disclosed in detail for illustrative purposes, it will be recognized that further variations or modifications of the disclosed apparatus, including the rearrangement of parts, lie within the scope of the present invention.

What is claimed is:

1. In a mechanical seal for sealing an annular sealing space between a housing and an axially-elongate rotatable shaft, said mechanical seal including a first seal ring mounted non-rotatably to said housing and a second seal ring rotatably connected to said shaft so as to rotate therewith, at least one of said first and second seal rings being axially movable relative to the other of said first and second seal rings and having a biasing arrangement which biases said one seal ring axially toward the other, said first and second seal rings having opposing seal faces disposed in sealing relation with each other to define a sealing region extending radially along said seal faces, said seal faces being relatively rotatable and axially separable during shaft rotation, comprising the improvement wherein one of said seal faces includes hydrodynamic lift features in a seal face region near a first circumferential boundary of said sealing region, said hydrodynamic lift features generating a hydrodynamic load lift within said sealing region during shaft rotation which hydrodynamically counteracts said biasing member to separate said seal faces and hydrodynamically generate a liquid film therebetween within said sealing region, one of said seal faces further including a plurality of annular grooves which are disposed near a second boundary of said sealing region opposite said first boundary, said grooves having a shallow depth and being separated radially one from the other by a plurality of annular lands extending radially therebetween such that gas in said liquid film collects in said grooves while liquid is retained along said lands by surface tension, said grooves and said lands defining alternating rings of said gas and said film liquid to define a leakage barrier during shaft rotation which prevents radial flow of said film liquid from said hydrodynamic lift features across said grooves and out of said sealing region.

2. The seal according to claim 1, wherein said fluid being sealed is a liquid which is flowable into said sealing region through the region of said hydrodynamic lift features to define said liquid film.

3. The seal according to claim 2, wherein said first and second boundaries of said sealing region define a radial width thereof, said hydrodynamic lift features and said plurality of said grooves being separated radially from each other by an annular intermediate land.

4. The seal according to claim 1, wherein said fluid being sealed is a gas, said mechanical seal including a liquid supply system which is in fluid communication with said seal faces to supply a liquid thereto that defines said liquid film.

5. The seal according to claim 1, wherein said hydrodynamic lift features define a portion of said liquid film which extends continuously radially between said first boundary of said sealing region and one of said grooves which is disposed nearest to said hydrodynamic lift features.

6. The seal according to claim 5, wherein an annular intermediate land is defined radially between said hydrodynamic lift features and said nearest groove.

7. The seal according to claim 1, wherein said hydrodynamic lift features are one of spiral grooves, waves and T-slots.

8. In a mechanical seal for sealing an annular sealing space between a housing and a rotatable shaft which extends axially, said mechanical seal including a first seal ring mounted non-rotatably to said housing and a second seal ring rotatably connected to said shaft so as to rotate therewith, one of said first and second seal rings being axially movable relative to the other of said first and second seal rings and having a biasing arrangement which biases said one seal ring axially toward the other, said first and second seal rings having opposing seal faces disposed in sealing relation with each other to define a sealing region extending radially along said seal faces, said seal faces being relatively rotatable and axially separable during shaft rotation such that a liquid film is defined therebetween within said sealing region, comprising the improvement wherein one of said seal faces includes hydrodynamic lift features which comprise a plurality of circumferentially spaced apart recesses, each said recess extending radially away from a first end thereof near a first circumferential boundary of said sealing region and toward an interior second end, a film liquid being disposed between said seal faces, and said recesses receiving said film liquid therein and generating hydrodynamic lift within said sealing region during shaft rotation to control separation of said seal faces, said liquid film extending radially uninterrupted between said first and second ends of said recesses to hydrodynamically counteract said biasing arrangement for stable non-contacting separation of said seal faces, one of said seal faces further including a plurality of annular grooves disposed radially between a second boundary of said sealing region opposite said first boundary and said interior second ends of said hydrodynamic recesses, said grooves having a shallow depth and being separated one from the other by annular lands extending radially therebetween, said grooves and said lands being configured such that gas in said liquid film separates therefrom during shaft rotation and collects in said grooves while liquid is retained along said lands, alternating rings of said gas and said film liquid being formed during shaft rotation by the configuration of said grooves and said lands to define a leakage barrier during shaft rotation which prevents movement of said film liquid radially across said annular grooves to prevent leakage of said film liquid from said second boundary.

9. The seal according to claim 8, wherein each of said seal faces is a planar flat surface, said seal faces being parallel to one another during shaft rotation.

10. The seal according to claim 9, wherein said liquid film is a uniform thickness in the regions of said rings of said film liquid and seal face regions defined circumferentially between said recesses.

11. The seal according to claim 9, wherein said recesses are defined by circumferentially spaced apart waves which act circumferentially on said liquid film.

12. The seal according to claim 8, wherein said rings of said gas and said film liquid prevent movement of said film liquid radially and restrict movement of said film liquid to a circumferential direction, said recesses acting circumferentially on said film liquid.

13. The seal according to claim 8, wherein said second ends of said recesses and said grooves are spaced radially apart to define an intermediate annular land extending radially therebetween.

14. In a mechanical seal having first and second seal rings which are disposed one next to the other along a rotating member adjacent to a seal chamber having a sealed fluid therein, said seal rings having respective opposing seal faces which define a radial sealing region therebetween which prevents leakage of said sealed fluid along said rotating member, said seal rings being relatively rotatable during rotation of said rotating member, comprising the improvement wherein said sealing region includes an annular grooved seal face region and an annular hydrodynamic seal face region disposed radially next to said grooved seal face region, said seal faces being in contacting relation in the absence of shaft rotation, and a film liquid being supplied to said hydrodynamic seal face region during shaft rotation, said hydrodynamic seal face region including hydrodynamic lift features formed in one of said seal faces wherein said hydrodynamic lift features receive said film liquid and generate a liquid film that is disposed axially between said seal faces and extends radially within said sealing region during shaft rotation, said liquid film defining a lift load which maintains said seal faces in axially spaced, non-contacting relation during shaft rotation, said grooved seal face region including a plurality of annular concentric grooves formed in one of said seal faces wherein said grooves are radially spaced apart from each other by seal face lands extending radially therebetween and receive said film liquid during shaft rotation, said grooves and said lands being configured such that gases in said film liquid separate therefrom during shaft rotation and collect within said plurality of grooves, said lands having film liquid disposed between each said land and said seal face opposite thereto wherein said concentric grooves define a plurality of liquid-gas interfaces spaced radially apart from each other across said grooved seal face region to support a radial pressure gradient between inner and outer diameters of said grooved seal face region to prevent leakage of film liquid radially from said hydrodynamic seal face region across said grooved seal face region.

15. The seal according to claim 14, wherein each of said lands has a radial width which is several times greater than a thickness of said liquid film.

16. The seal according to claim 15, wherein said concentric grooves are capable of supporting a maximum radial pressure gradient which is greater than a radial seal face pressure defined by hydrostatic pressure from said sealed fluid and hydrodynamic pressure from said hydrodynamic lift features.

17. The seal according to claim 16, wherein said hydrodynamic lift features comprise wavy surface sections formed in said seal face.

18. The seal according to claim 14, wherein said liquid film is defined by said sealed fluid between said seal faces.

19. The seal according to claim 14, wherein at least one of said seal rings is axially movable and biased towards the other of said seal rings by a biasing force, said lift load generated by said hydrodynamic lift features acting to overcome said biasing force and effect separation of said seal faces during shaft rotation.

\* \* \* \* \*